(12) United States Patent
Savaglio et al.

(10) Patent No.: US 7,974,389 B2
(45) Date of Patent: *Jul. 5, 2011

(54) METHOD OF PROVIDING 911 SERVICE TO A PRIVATE BRANCH EXCHANGE

(75) Inventors: John Joseph Savaglio, Oak Lawn, IL (US); Richard Bruce Fowler, Naperville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 385 days.

This patent is subject to a terminal disclaimer.

(21) Appl. No.: 12/251,238

(22) Filed: Oct. 14, 2008

(65) Prior Publication Data

US 2009/0034691 A1 Feb. 5, 2009

Related U.S. Application Data

(63) Continuation of application No. 11/037,524, filed on Jan. 18, 2005, now Pat. No. 7,436,938, which is a continuation of application No. 10/635,132, filed on Aug. 6, 2003, now Pat. No. 6,950,499, which is a continuation of application No. 10/278,602, filed on Oct. 23, 2002, now Pat. No. 6,650,733, which is a continuation of application No. 10/093,749, filed on Mar. 8, 2002, now Pat. No. 6,501,831, which is a continuation of application No. 09/642,430, filed on Aug. 21, 2000, now Pat. No. 6,415,019.

(51) Int. Cl.
 *H04M 11/00* (2006.01)

(52) U.S. Cl. ............................................ 379/45; 379/37

(58) Field of Classification Search .................... 379/45, 379/37–40
See application file for complete search history.

(56) References Cited

U.S. PATENT DOCUMENTS

| | | | |
|---|---|---|---|
| 4,310,726 A | 1/1982 | Asmuth | |
| 4,488,004 A | 12/1984 | Bogart et al. | |
| 4,611,096 A | 9/1986 | Asmuth et al. | |
| 5,161,180 A | 11/1992 | Chavous | |
| 5,235,630 A | 8/1993 | Moody et al. | |
| 5,339,351 A | 8/1994 | Hoskinson et al. | |
| 5,347,567 A | 9/1994 | Moody et al. | |
| 5,347,568 A | 9/1994 | Moody et al. | |
| 5,422,943 A | 6/1995 | Cooney et al. | |
| 5,579,368 A | 11/1996 | van Berkum | |
| 5,646,985 A | 7/1997 | Andruska et al. | |

(Continued)

FOREIGN PATENT DOCUMENTS

EP 0553754 8/1993

(Continued)

OTHER PUBLICATIONS

Advisory Action, issued in U.S. Appl. No. 11/037,524, mailed Dec. 6, 2005, 3 pages.

(Continued)

*Primary Examiner* — Stella L Woo

(74) *Attorney, Agent, or Firm* — Hanley, Flight & Zimmerman LLC

(57) ABSTRACT

A method of providing 911 service to a private branch exchange, includes grouping a plurality of private telephone numbers into a set. An outgoing telephone line for a 911 call is assigned to the set. A location information for the outgoing telephone line is input into a location database.

20 Claims, 4 Drawing Sheets

U.S. PATENT DOCUMENTS

| | | | |
|---|---|---|---|
| 5,818,921 | A | 10/1998 | Vander Meiden et al. |
| 5,974,133 | A | 10/1999 | Fleischer, III et al. |
| 6,243,442 | B1 | 6/2001 | Tanaka et al. |
| 6,266,397 | B1 | 7/2001 | Stoner |
| 6,415,019 | B1 * | 7/2002 | Savaglio et al. ............... 379/45 |
| 6,501,831 | B2 * | 12/2002 | Savaglio et al. ............... 379/45 |
| 6,567,514 | B2 | 5/2003 | Fleischer, III et al. |
| 6,650,733 | B2 * | 11/2003 | Savaglio et al. ............... 379/45 |
| 6,711,247 | B1 | 3/2004 | Needham et al. |
| 6,804,329 | B2 | 10/2004 | Geck et al. |
| 6,854,094 | B2 | 2/2005 | Inui et al. |
| 6,950,499 | B2 * | 9/2005 | Savaglio et al. ............... 379/45 |
| 7,116,775 | B2 | 10/2006 | Lee |

FOREIGN PATENT DOCUMENTS

| | | |
|---|---|---|
| JP | 62116056 | 5/1987 |
| JP | 3106194 | 5/1991 |
| JP | 6217043 | 8/1994 |
| JP | 20000069512 | 3/2000 |
| JP | 2001320749 | 11/2001 |

OTHER PUBLICATIONS

Office Action, issued in U.S. Appl. No. 11/037,524, mailed Jan. 11, 2006, 7 pages.

Office Action, issued in U.S. Appl. No. 11/037,524, mailed Sep. 28, 2007, 5 pages.

Office Action, issued in U.S. Appl. No. 11/037,524, mailed Jan. 2, 2008, 5 pages.

Notice of Allowance, issued in U.S. Appl. No. 11/037,524, mailed Jun. 27, 2008, 4 pages.

Office Action, issued in U.S. Appl. No. 10/635,132, mailed Jul. 15, 2004, 5 pages.

Notice of Allowance, issued in U.S. Appl. No. 10/635,132, mailed Nov. 24, 2004, 3 pages.

Notice of Allowance, issued in U.S. Appl. No. 09/642,430, mailed Feb. 1, 2002, 3 pages.

Notice of Allowance issued in U.S. Appl. No. 10/278,602, mailed Jul. 10, 2003, 4 pages.

Office Action, issued in U.S. Appl. No. 10/278,602, mailed May 27, 2003, 7 pages.

Office Action, issued in U.S. Appl. No. 10/278,602, mailed Apr. 8, 2003, 4 pages.

Notice of Allowance, issued in U.S. Appl. No. 10/093,749, mailed Aug. 26, 2002, 4 pages.

Office Action, issued in U.S. Appl. No. 10/093,749, mailed Jun. 3, 2002, 5 pages.

Office Action, issued in U.S. Appl. No. 11/037,524, mailed Sep. 30, 2005, 6 pages.

Motorola Intelligence Everywhere, Guide to Understanding 3-1-1 Systems, Sep. 2002, 8 pages.

XTEND Communications Corp., Who Dialed 911? A look at the issues surrounding Enhanced 911, Copyright 2003 XTEND Communications Corp., 4 pages.

PBX Vulnerability Analysis, Finding Holes in Your PBX Before Someone Else Does, Special Publication 800-24, United States Department of Commerce, National Institute of Standards and Technology, Aug. 2000, 66 pages.

* cited by examiner

METHOD OF PROVIDING 911 SERVICE TO A PRIVATE BRANCH EXCHANGE

RELATED APPLICATIONS

The present application is a continuation of U.S. application Ser. No. 11/037,524, filed Jan. 18, 2005, now U.S. Pat. No. 7,436,938, which is a continuation of U.S. application Ser. No. 10/635,132, filed Aug. 6, 2003, now U.S. Pat. No. 6,950,499, which is a continuation of U.S. application Ser. No. 10/278,602, filed Oct. 23, 2002, now U.S. Pat. No. 6,650,733, which is a continuation of U.S. application Ser. No. 10/093,749, filed Mar. 8, 2002, now U.S. Pat. No. 6,501,831, which is a continuation of U.S. application Ser. No. 09/642,430, filed Aug. 21, 2000, now U.S. Pat. No. 6,415,019, which are hereby incorporated herein by reference in their entireties.

FIELD OF THE DISCLOSURE

The present invention relates to generally to the field of 911 emergency service systems and more particularly to a method of providing 911 service to a private branch exchange.

BACKGROUND

A Public Safety Answering Point (PSAP) uses an automatic location identification (ALI) information provided with the automatic number identification (ANI) to determine the location of a 911 telephone call. Unfortunately, when a 911 call is placed from a business having a PBX (Private Branch Exchange), the PSAP only receives the billing address of the business. For large businesses having multiple locations, this does not provide any useful information. Some PBX providers allow the owners to enter in correct location information for all their lines. Unfortunately, this is time consuming and therefor rarely is done.

Thus there exists a need for a method of providing 911 service to a private telephone numbering system that is easy to setup.

DETAILED DESCRIPTION OF THE DRAWINGS

A method of providing 911 service to a private branch exchange, includes grouping a plurality of private telephone numbers into a set. An outgoing telephone line for a 911 call is assigned to the set. A location information for the outgoing telephone line is input into a location database (E911 database). By grouping the telephone lines significantly less information has to be input into the location database. The groups are selected to be telephone lines in a set geographic area. For instance all the telephones on the third floor of a small building might be grouped together. This provides emergency personnel with plenty of information to locate the emergency.

Figure 1:
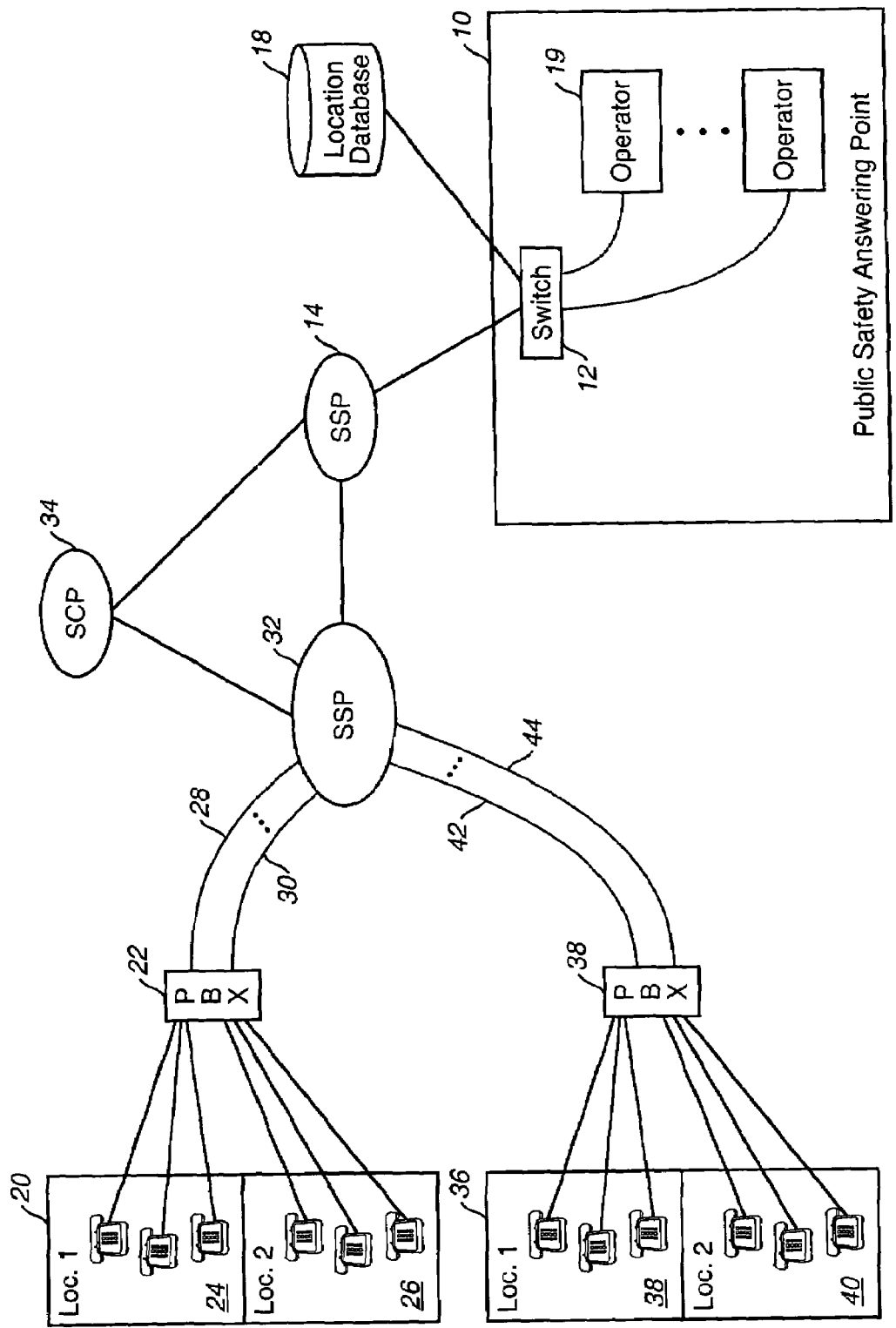
FIG. 1 is a block diagram of public safety answering service for a private telephone numbering system in accordance with one embodiment of the invention.

FIG. 1 is a block diagram of public safety answering service for a private branch exchange in accordance with one embodiment of the invention. A public safety answering point (PSAP) 10 includes a switch 12 connected to a SSP (Service Switching Point) 14. The switch 12 triggers on incoming call and forms a location query. The location query is set to a location database (E911 database) 16. The call and location information are forwarded to one of a plurality of operators 19.

A company 20 using a PBX 22 groups private telephone lines according to their location. This company 20 has two locations 24, 26. Any 911 call from the first location 24 is routed over a predetermined public telephone line 28. Any 911 call from the second location 26 is routed over a predetermined public telephone line 30. The PBX 22 is connected to a SSP 32. A 911 call is then sent to SSP 14 and to the PSAP 10. A SCP (Service Control Point) 34 is connected through an intelligent network to the SSPs 14, 32. The SCP 34 may provide routing information to the SSP 32 for 911 calls. A second company 36 also has a PBX 38. The company 36 also divides its telephones into two locations 38, 40. Note that any number of locations could be handled and the invention encompasses more than a single PBX. A 911 call from any of the telephones in the first location 38 are routed over a predetermined external telephone line 42. A 911 call from any of the telephones in the second location 40 are routed over a predetermined external telephone line 44.

Figure 2:
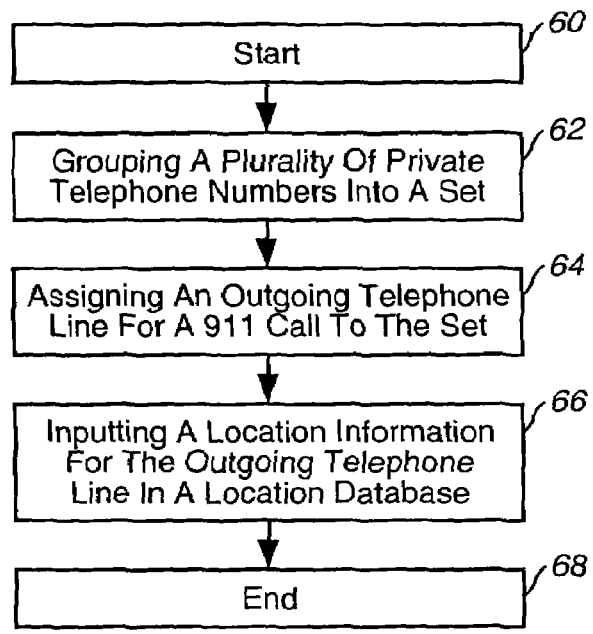
FIG. 2 is a flow chart of the steps used in a method of providing 911 service to a private branch exchange in accordance with one embodiment of the invention.

FIG. 2 is a flow chart of the steps used in a method of providing 911 service to a private branch exchange in accordance with one embodiment of the invention. The process start, step 60, by grouping a plurality of telephone numbers into a set at step 62. An outgoing telephone line for a 911 call is assigned to the set at step 64. At step 66, a location information for the outgoing telephone line is input into a location database of a telephone company which ends the process at step 68. In one embodiment, the plurality of private telephone numbers are selected by an origination location. In one embodiment a private branch exchange is programmed to select the outgoing telephone line when a 911 call is received from one of the plurality of private telephone numbers.

In one embodiment when the 911 call is dialed from one of the plurality of, private telephone numbers, the 911 call is sent out over the outgoing telephone line. The 911 call is triggered on at a service switching point. A routing query is transmitted to a switching control point (SCP). A routing instruction is received from the SCP. The 911 call is routed to a proper PSAP. A location database is queried for a location associated with a telephone number of the outgoing telephone line.

Figure 3:
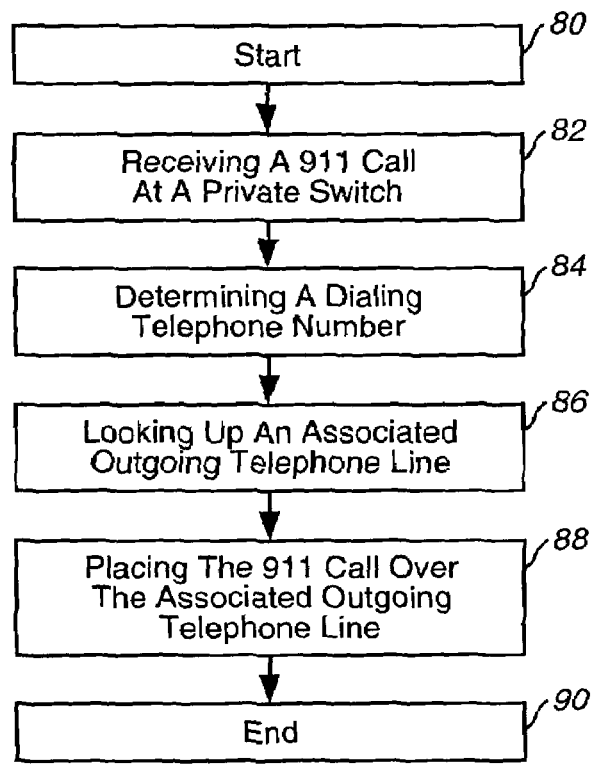
FIG. 3 is a flow chart of the steps used in a method of providing 911 service to a private branch exchange in accordance with one embodiment of the invention.

FIG. 3 is a flow chart of the steps used in a method of providing 911 service to a private branch exchange in accordance with one embodiment of the invention. The process starts, step 80, by receiving a 911 call at a private switch at step 82. In one embodiment, the private switch is a private branch exchange. A dialing telephone number is determined at step 84. An associated outgoing telephone line is looked up at step 86. At step 88, the 911 call is placed over the associated outgoing telephone line which ends the process at step 90. The 911 call is received at a service switching point (SSP). The 911 call is triggered on and the SSP sends a query to a switching control point (SCP). A response is received that includes a routing instruction. In one embodiment the response includes the number of the associated outgoing telephone line. The 911 call is routed to a public safety answering point (PSAP). A location query is sent to a location database.

The 911 call is forwarded to an operator. A location information is transmitted to the operator.

In one embodiment, a first plurality of private telephone numbers are grouped into a first set. A second plurality of private telephone numbers are grouped into a second set. One of a plurality of outgoing telephone lines is assigned to the first set. A second of the plurality of outgoing telephone lines is assigned to the second set. The location database is programmed to include a location for the one of the plurality of outgoing telephone lines and a second location for the second of the plurality of outgoing telephone lines.

Figure 4:
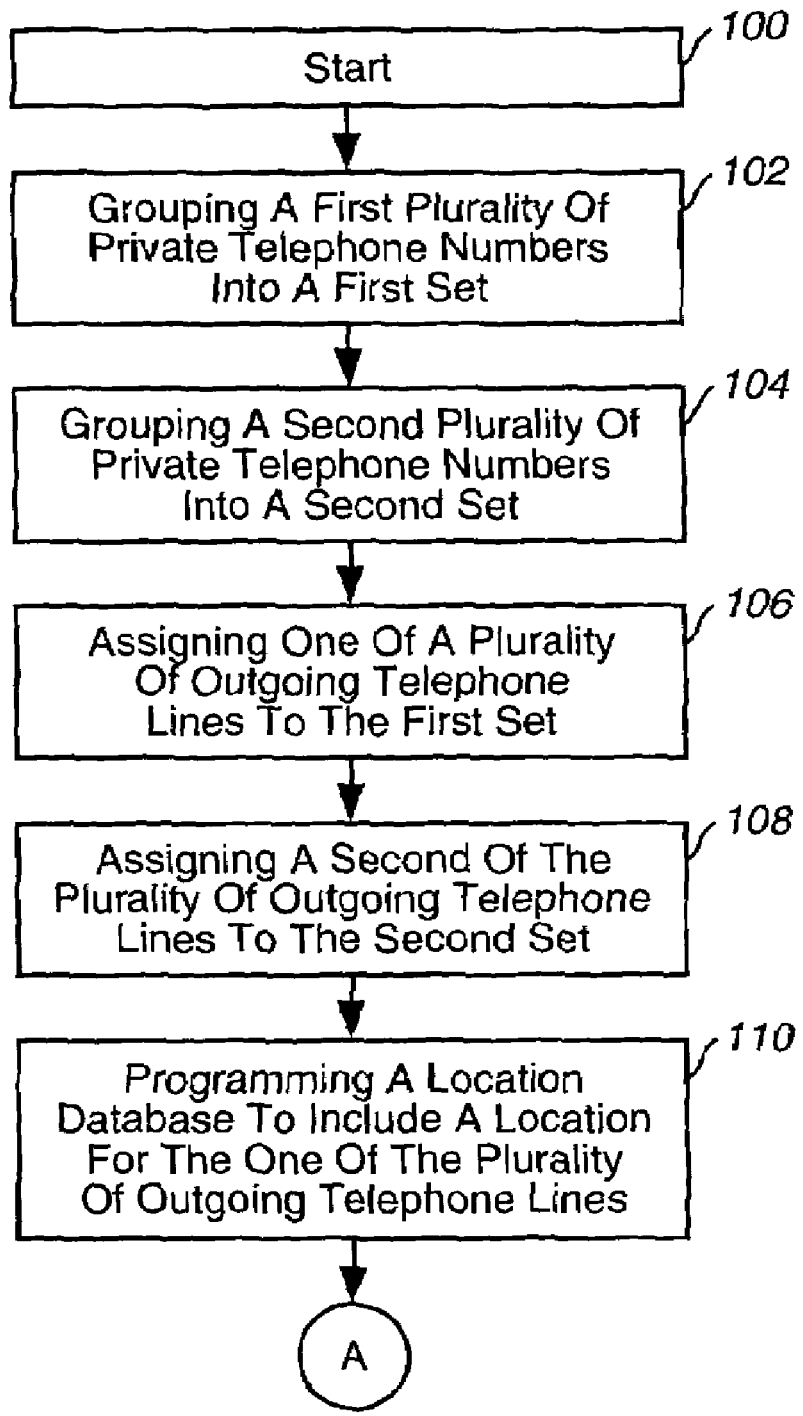
FIGS. 4 & 5 are a flow chart of the steps used in a method of providing 911 service to a private branch exchange in accordance with one embodiment of the invention.
Figure 5:
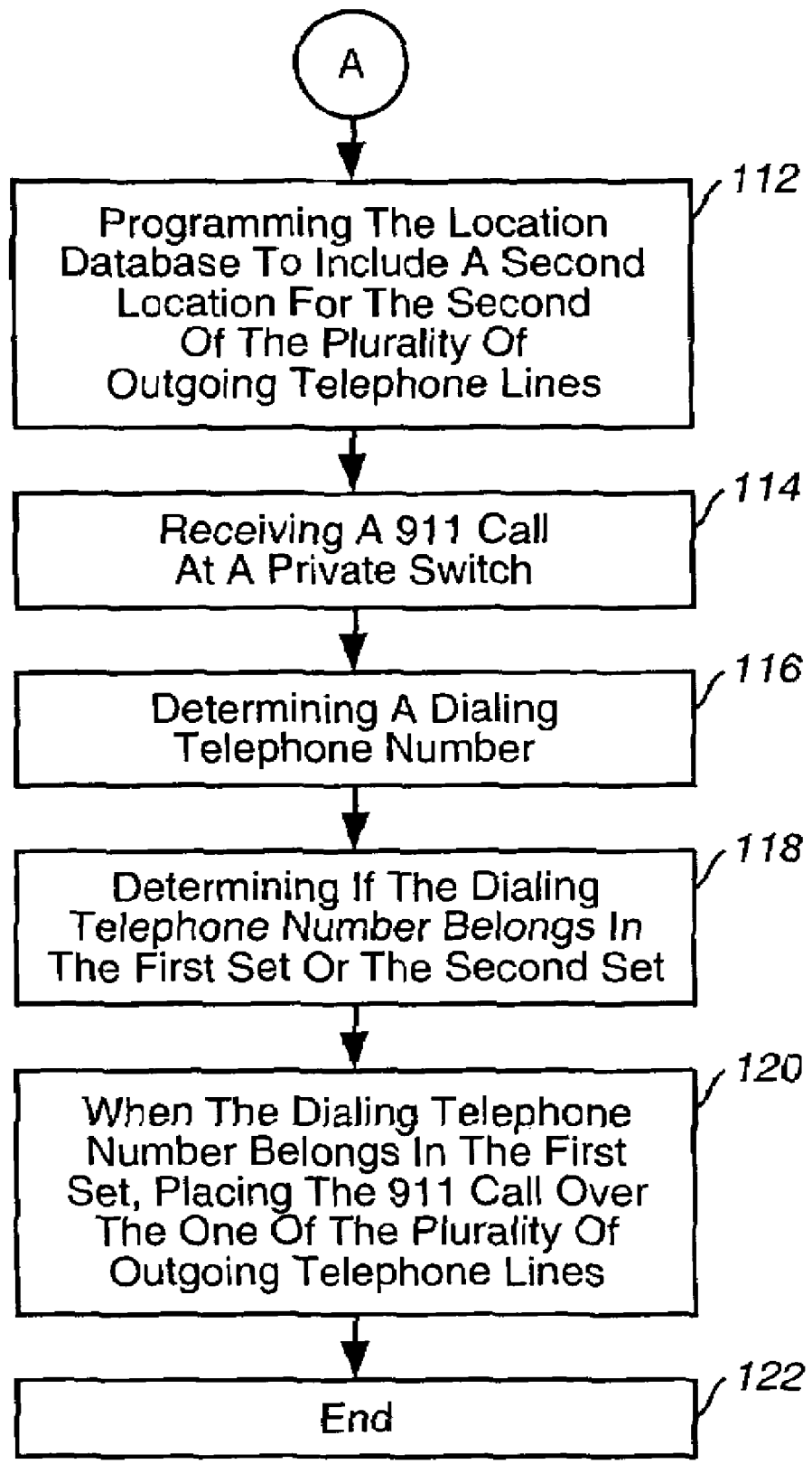

FIGS. 4 & 5 are a flow chart of the steps used in a method of providing 911 service to a private branch exchange in accordance with one embodiment of the invention. The process starts, step 100, by grouping a first plurality of private telephone numbers into a first set at step 102. A second plurality of private telephone numbers is grouped into a second set at step 104. One of a plurality of outgoing telephone lines is assigned to the first set at step 106. A second of the plurality of outgoing telephone lines is assigned to the second set at step 108. A location database is programmed to include a location for the one of the plurality of outgoing telephone lines at step 110. The location database is programmed to include a second location for the second of the plurality of outgoing telephone lines at step 112. A 911 call is received at a private switch at step 114. A dialing telephone number is determined at step 116. At step 118 it is determined if the dialing telephone number belongs in the first set or the second set. When the dialing telephone number belongs in the first set at step 120, the 911 call is placed over the one of the plurality of outgoing telephone lines which ends the process at step 122. When the dialing telephone number belongs in the second set, the 911 call is placed over the second of the plurality of outgoing telephone lines. The 911 call is received at a service switch point. The 911 call is triggered on and a query is sent to a switching control point. A response is received that includes a routing instruction. The 911 call is routed to a public safety answering point. A location query is sent to the location database. The call is forwarded to an operator. A location information is transmitted to the operator.

Thus there has been described a method of providing 911 service to a private telephone numbering system that is easy to setup.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of providing emergency service to a private branch exchange, comprising:
   determining a first geographic location of a first telephone associated with a first internal telephone line coupled to the private branch exchange;
   determining a second geographic location of a second telephone associated with a second internal telephone line coupled to the private branch exchange;
   when the first geographic location and the second geographic location are substantially similar, grouping the first and second internal telephone lines to form a set; and
   assigning an outgoing telephone line for an emergency call to the set.

2. A method as defined in claim 1, further comprising entering the first and second geographic locations into a location information database.

3. A method as defined in claim 2, further comprising receiving the emergency call at the private branch exchange; and sending a location query to the location database.

4. A method as defined in claim 1, further comprising placing the emergency call received from the first telephone on the outgoing telephone line to indicate the first geographic location of the first telephone.

5. A method as defined in claim 1, further comprising when the emergency call is triggered on at a service switching point, sending a query to a switching control point.

6. A method as defined in claim 5, further comprising receiving a routing instruction from the switching control point.

7. A method as defined in claim 6, further comprising routing the emergency call to a public safety answering point.

8. A method as defined in claim 1, wherein an identity of the outgoing telephone line is inherently indicative of the first and second locations.

9. A method of providing emergency service to a private branch exchange, comprising:
   grouping a plurality of internal telephones coupled to the private branch exchange into a plurality of groups based on a geographic location of the respective internal telephones;
   respectively assigning outgoing telephone lines to the groups, the outgoing telephone lines to be used for emergency calls; and
   when an emergency call is received from a first one of the internal telephones, inherently determining at the private branch exchange the location of the first one of the internal telephones by looking up the outgoing telephone line associated with the first one of the internal telephones with a logic circuit.

10. A method as defined in claim 9, further comprising routing the emergency call to a public safety answering point.

11. A method as defined in claim 10, the public safety answering point including a location database containing information associated with the location of the respective internal telephones.

12. A method as defined in claim 11, further comprising communicating the location of the first one of the internal telephones from the location database to an operator at a public safety answering point.

13. A method as defined in claim 9, further comprising placing the emergency call over the outgoing telephone assigned to the first one of the internal telephones making the emergency call.

14. A method of providing emergency service to a private branch exchange, comprising:
   assigning a first one of a plurality of outgoing telephone lines to a first set of internal telephone lines, the internal telephone lines being grouped based on physical location information associated with the internal telephone lines;
   recording the physical location information in a location database;
   receiving an emergency call at the private branch exchange coupled to the outgoing telephone lines;
   when the emergency call originated at one of the internal telephone lines of the first set, causing an apparatus to place the emergency call over the first one of the plurality of outgoing telephone lines;

receiving the emergency call at a public safety answering point; and determining a physical location of a telephone placing the emergency call based on an identity of the first one of the plurality of outgoing telephone lines.

15. A method as defined in claim 14, further comprising forwarding the emergency call to an operator.

16. A method as defined in claim 14, further comprising transmitting the physical location to an operator.

17. A method as defined in claim 14, further comprising assigning a second one of a plurality of outgoing telephone lines to a second set of internal telephone lines.

18. A method as defined in claim 17, further comprising placing the emergency call over the second one of the plurality of outgoing telephone lines when the emergency call originated at one of the internal telephone lines of the second set.

19. A tangible machine accessible medium having instructions stored thereon that, when executed, cause a machine to at least:

group a plurality of internal telephones coupled to a private branch exchange into a plurality of groups based on a geographic location of the respective internal telephones;

respectively assign outgoing telephone lines to the groups, the outgoing telephone lines to be used for emergency calls; and when an emergency call is received from a first one of the internal telephones, inherently determine at the private branch exchange the location of the first one of the internal telephones by looking up the outgoing telephone line associated with the first one of the internal telephones.

20. A tangible machine accessible medium as defined in claim 19 further comprising instructions stored thereon that, when executed, cause the machine to route the emergency call to a public safety answering point including a location database storing information associated with the location of the respective internal telephones.

* * * * *